(12) United States Patent
Matsuzaki et al.

(10) Patent No.: US 6,492,982 B1
(45) Date of Patent: Dec. 10, 2002

(54) IMAGE DISPLAY CONTROL METHOD AND APPARATUS

(75) Inventors: Eiichi Matsuzaki, Chofu (JP); Masaki Nakano, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/511,244

(22) Filed: Feb. 23, 2000

(30) Foreign Application Priority Data

Feb. 26, 1999 (JP) .......................................... 11-096737

(51) Int. Cl.[7] ................................................ G09G 5/00
(52) U.S. Cl. ........................ 345/204; 345/214; 709/247
(58) Field of Search .......................... 345/3.1–3.4, 204, 345/211, 213, 101, 214, 660, 668–673, 698, 699; 348/554, 555, 556, 558; 709/246, 247

(56) References Cited

U.S. PATENT DOCUMENTS

| | | | |
|---|---|---|---|
| 5,251,301 A | * 10/1993 | Cook | 709/246 |
| 5,613,103 A | 3/1997 | Nobutani et al. | 395/501 |
| 5,627,569 A | 5/1997 | Matsuzaki et al. | 345/214 |
| 5,717,420 A | 2/1998 | Matsuzaki et al. | 345/97 |
| 5,736,981 A | 4/1998 | Nobutani et al. | 345/185 |
| 5,761,438 A | * 6/1998 | Sasaki | 709/247 |
| 5,838,291 A | 11/1998 | Ohshima et al. | 345/97 |
| 5,856,817 A | 1/1999 | Matsuzaki | 345/98 |
| 5,926,159 A | 7/1999 | Matsuzaki et al. | 345/97 |
| 5,990,982 A | * 11/1999 | Gove et al. | 348/750 |
| 6,075,513 A | * 6/2000 | Reddy et al. | 345/112 |

* cited by examiner

*Primary Examiner*—Lun-Yi Lao
*Assistant Examiner*—Tom V. Sheng
(74) *Attorney, Agent, or Firm*—Fitzpatrick, Cella, Harper & Scinto

(57) ABSTRACT

Disclosed are an image display control apparatus and method for outputting an image signal to a display device to thereby display an image on the display device. A resolution converter converts the resolution of image data, which is transmitted to the display device, in comparison with the resolution of the display device. The image data that has undergone the resolution conversion is reduced in amount by a reducing processor on a per-line basis or per-pixel basis in conformity with the display resolution of the display device. The image data the amount of data whereof has been reduced by the reducing processor is transmitted to the display device together with a synchronizing signal. In accordance with a select signal from a display timing generator, an image data selector operates so as to transmit control data such as a program to the display device within a transfer time in which idle time has been produced based upon the amount of the reduction in data.

18 Claims, 25 Drawing Sheets

FIG. 20

| b3 | b2 | b1 | b0 | CONTENT |
|---|---|---|---|---|
| 0 | 0 | 0 | 0 | RESERVED |
| 0 | 0 | 0 | 1 | γ VALUE |
| 0 | 0 | 1 | 0 | LUMINANCE INFORMATION |
| 0 | 0 | 1 | 1 | CONTRAST INFORMATION |
| 0 | 1 | 0 | 0 | COLOR (R) |
| 0 | 1 | 0 | 1 | COLOR (G) |
| 0 | 1 | 1 | 0 | COLOR (B) |
| 0 | 1 | 1 | 1 | RESERVED |
| 1 | 0 | 0 | 0 | PROGRAM A |
| 1 | 0 | 0 | 1 | PROGRAM B |
| 1 | 0 | 1 | 0 | PROGRAM C |
| | | | | ⋮ |

| b1 | b0 | CONTENT |
|---|---|---|
| 0 | 0 | BYTE NO. 1 VALID |
| 0 | 1 | BYTE NOS. 1 AND 2 VALID |
| 1 | 0 | BYTE NOS. 1, 2 AND 3 VALID |
| 1 | 1 | INVALID |

IMAGE DISPLAY CONTROL METHOD AND APPARATUS

FIELD OF THE INVENTION

This invention relates to an image display control method and apparatus for outputting an image display signal to a display device to display an image on the device.

BACKGROUND OF THE INVENTION

An image display system known in the art includes an image display controller and a display unit connected via a digital interface. In such an image display system, image data is transmitted from the image display controller to the display unit via the digital interface and, in addition, control data for requesting various operations is transmitted from the display controller to the display unit via the digital interface.

In an arrangement of this kind, the command data usually is transmitted at a timing different from that of the image data. However, in instances where a high-resolution image is displayed as in the case of high-definition television, for example, a very large quantity of image data is involved. If the command data is inserted during interims of the image data, therefore, little time is available for transmission of the command data. In particular, when the amount of command data transmitted from the display controller to the display unit is very large, time for transmission of the command data can no longer be assured.

SUMMARY OF THE INVENTION

Accordingly, an object of the present invention is to provide an image display control method and apparatus for reducing the amount of image data to be transmitted, thereby assuring idle time in transmission of the data, and for transmitting command data during this idle time.

Another object of the present invention is to provide an image display control method and apparatus for transmitting command data between items of image data while eliminating dedicated transmission means for transmission of command data.

A further object of the present invention is to provide an image display control method and apparatus in which when image data is transmitted to one display unit of a plurality of display units mounted in a display device, command data is transmitted using an image-data line signal of another of the display units.

According to the present invention, the foregoing objects are attained by providing an image display control apparatus for outputting an image signal to a display device to thereby display an image on the display device, comprising: reducing means for reducing the amount of image data, which is to be transmitted to the display device, in comparison with display resolution of the display device; transmitting means for transmitting the image data, the amount of data whereof has been reduced by the reducing means, to the display device together with a synchronizing signal; and control-data transmitting means for transmitting control data to the display device over a period of time commensurate with the amount of data that has been reduced.

According to the present invention, the foregoing objects are attained by providing an image display control method for outputting an image signal to a display device to thereby display an image on the display device, comprising: a reducing step of reducing the amount of image data, which is to be transmitted to the display device, in comparison with display resolution of the display device; a transmitting step of transmitting the image data, the amount of data whereof has been reduced at the reducing step, to the display device together with a synchronizing signal, and a control-data transmitting step of transmitting control data to the display device over a period of time commensurate with the amount of data that has been reduced.

The display device displays the image data of the reduced amount upon performing an interpolation in conformity with the display resolution of the display device.

Preferably, line data in one vertical scanning interval is downsampled on a per-line basis in order to reduce the amount of image data to be transmitted to the display device.

Preferably, line data in one horizontal scanning interval is downsampled on a per-pixel basis in order to reduce the amount of image data to be transmitted to the display device.

Preferably, odd-numbered line data is transmitted in an initial vertical scanning interval and even-numbered line data is transmitted in the next vertical scanning interval in order to reduce the amount of image data to be transmitted to the display device.

Preferably, a control signal for distinguishing between transmission of image data and transmission of control data is provided.

Preferably, the frequency of the synchronizing signal is made one frequency when the image data is transmitted and a different frequency when the control data is transmitted in order to distinguish between transmission of image data and transmission of control data.

An arrangement may be adopted in which the display device has a plurality of display units (display panels), image data is transmitted to one of the display units and control data is sent to the display device at a transmission timing of display data that is transmitted to another of the display units. In this case, it will suffice to display an image on only one display unit, or the display device may interpolate received image data and display the results on a plurality of display units.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principle of the invention.

FIG. 20 is a diagram useful in describing program data and the content thereof classified by type of program;

DESCRIPTION OF THE PREFERRED EMBODIMENTS

Preferred embodiments of the present invention will now be described in detail with reference to the accompanying drawings.

[First Embodiment]

Figure 1:
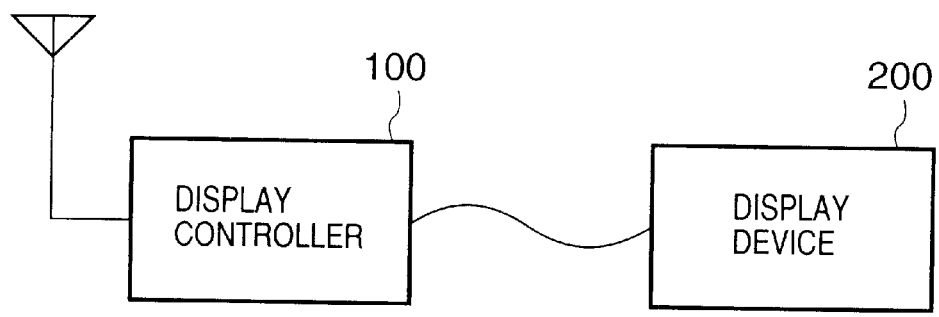
FIG. 1 is a block diagram showing the configuration of a digital television system according to an embodiment of the present invention.

FIG. 1 is a block diagram illustrating the configuration of a digital-broadcast receiving system according to a first embodiment of the present invention.

As shown in FIG. 1, the system includes a display controller 100 and a display device 200. The display controller 100 multiplexes signals such as compressed and encoded images and voice, receives television signals that have been sent to it upon being modulated, demodulates and decodes these television signals and outputs them to the display device 200. The latter is equipped with, e.g., a display panel having electron emission devices or the like or with a CRT, liquid crystal or plasma display for displaying images based upon an image signal and synchronizing signal sent from the display controller 100.

Figure 2:
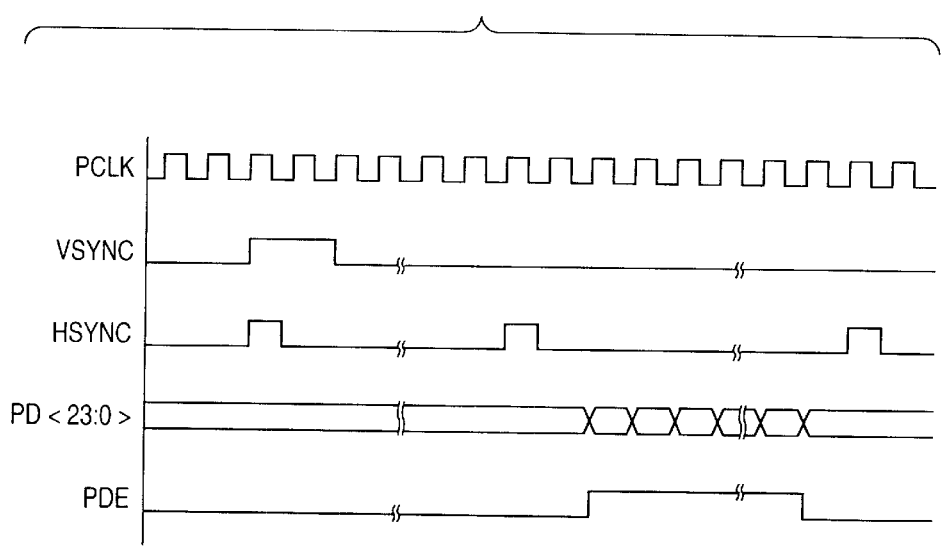
FIG. 2 is a timing charge useful in describing timing of data transmission between a display controller and a display device according to this embodiment.

FIG. 2 is a timing charge useful in describing the timing of signals sent from the display controller 100 to the display device 200 according to this embodiment.

The signals shown in FIG. 2 are a pixel clock (PCLK), horizontal and vertical synchronizing signals (HSYNC, VSYNC), 24-bit image data PD (PD00–PD23) comprising eight bits for each of R, G and B, and an image-data enable signal (PDE) indicating the effective interval of the image data.

Figure 3:
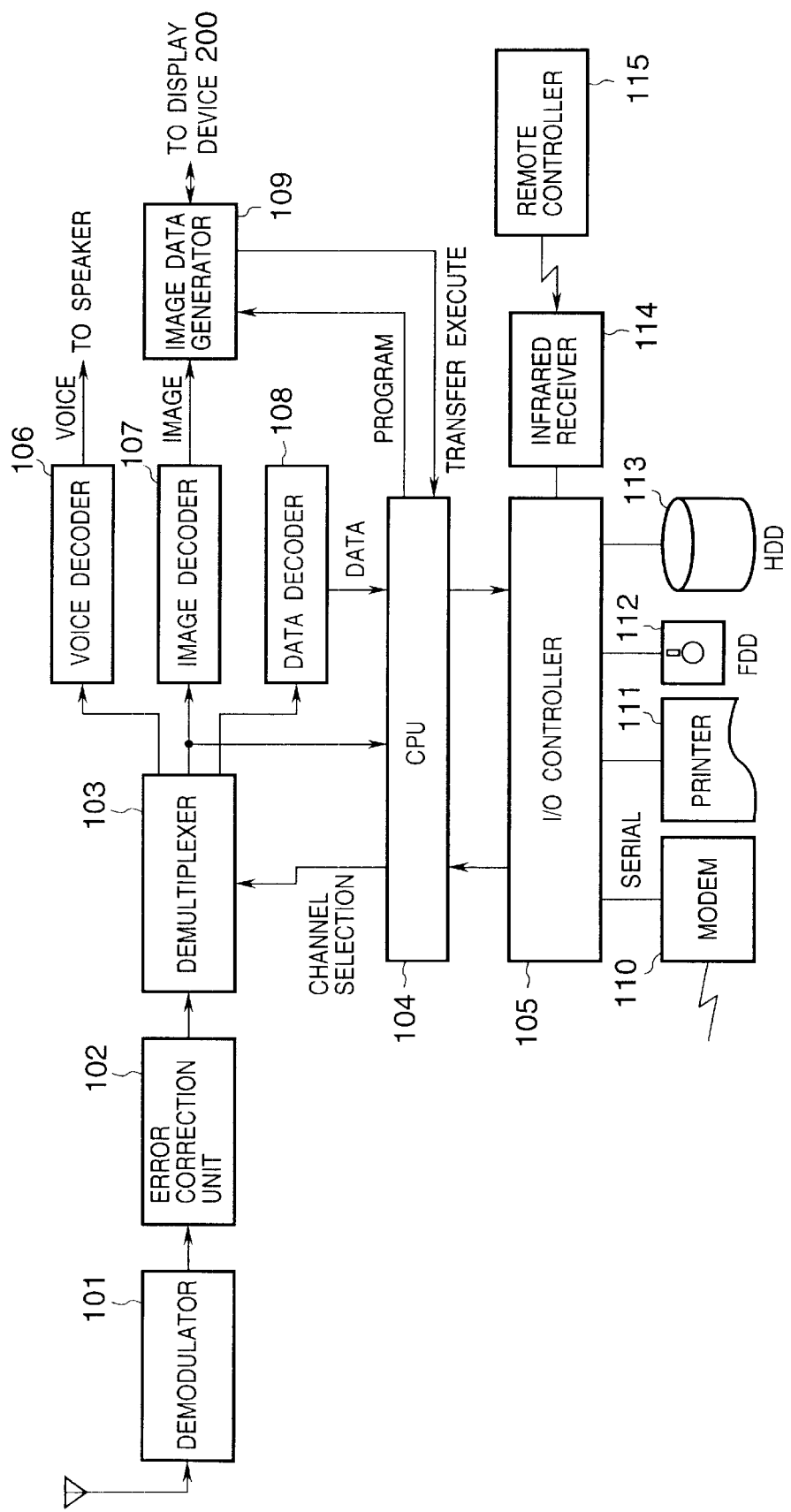
FIG. 3 is a block diagram showing the construction of a display controller according to this embodiment.

FIG. 3 is a block diagram illustrating the construction of the display controller 100 according to this embodiment.

The display controller 100 includes a demodulator 101 for demodulating a digital modulated signal that has been received, and an error correction unit 102 which, on the basis of the digital signal demodulated by the demodulator 101 and in accordance with an error detection code or the like, detects an error that has occurred on the transmitting side and uses an error correction code to restore the data in which the error has occurred. A demultiplexer 103 demultiplexes and extracts signals such as images, voice and data that have been multiplexed with the decoded signal. A CPU (controller) 104 controls the overall operation of the display controller 100. Connected to the CPU 104 is an input/output controller 105, to which are connected a modem 110, a printer 111, a floppy-disk drive (FDD) 112, a hard-disk drive (HDD) 113, and an infrared receiving unit 114 for receiving infrared light from a remote controller 115, which is operated by a user, and extracting data contained in the infrared light. The display controller 100 further includes a voice decoder 106, an image decoder 107 and a data decoder 108 for decoding various data such as voice data, image data and command, respectively, that have been encoded. An image data generator 109 executes a resolution conversion of the image data as well as generation of horizontal and vertical synchronizing signals and sends the display device 200 image data and timing signals, etc., that have been generated.

The following video formats have been considered for use in digital broadcast according to this embodiment: 1080I (1920×1080), 720P (1280×720) for HDTV (where I represents interlace and P progressive), and 480P (704×480), 480I (704×480) for SDTV.

In the arrangement set forth above, a television signal that has been transmitted from a television station is demodulated and corrected for error, demultiplexed into data such as images and voice and then decoded, and data such as an image data and command data contained in this data is input to the CPU 104, whence the data is stored on a floppy disk in the FDD 112 or on a hard disk in the HDD 113 via the input/output controller 105. Data relating to display control in the display device 200 is sent to the display device 200 as program information via the image data generator 109. Further, when the user operates the remote controller 115 to select a channel or to order adjustment of the image quality of an image displayed on the display device 200, the particular information specified is analyzed by the CPU 104 and, if it is necessary to make a transmission to the display device 200, the information is sent as program data to the display device 200 via the image data generator 109.

The modem 110 is for performing two-way communication via a telephone line. The HDD 113 or FDD 112 is used to store received image data or to store compressed image data in a recording medium (disk) before it is decoded. The FDD 112 is further used in a case where a program that has been stored on a floppy disk is installed in the display controller 100. A read/write-capable CD-ROM driver may be used instead of the FDD 112.

Figure 4:
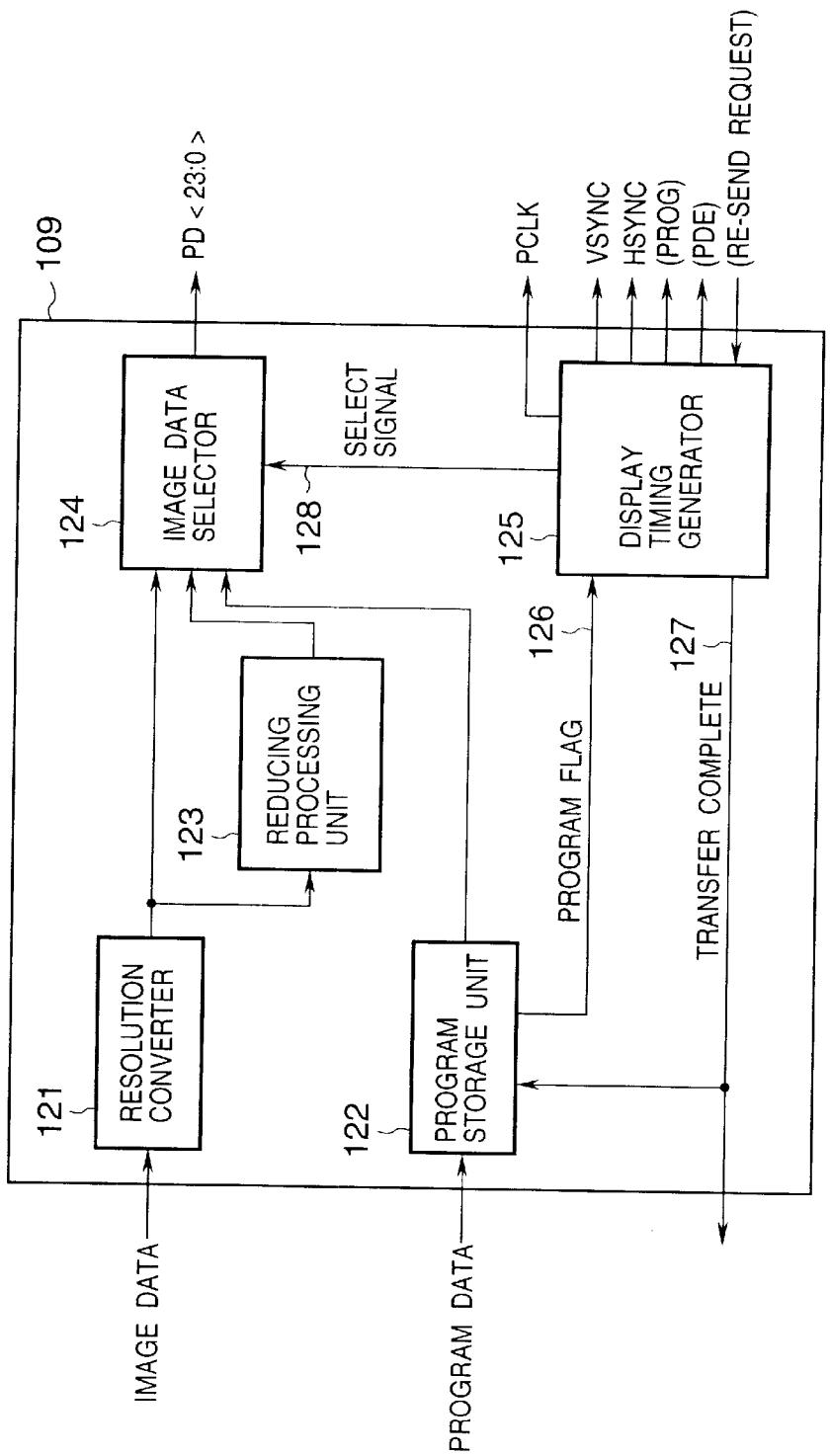
FIG. 4 is a block diagram showing the construction of an image data generator according to this embodiment.

FIG. 4 is a block diagram illustrating the construction of the image data generator 109 according to this embodiment.

As shown in FIG. 4, the image data generator 109 includes a resolution converter 121 for converting the resolution of received image data in accordance with the resolution of a display unit (display panel, CRT etc.) of the display device 200; a reducing processing unit 123 for compressing image data when program data, described later, is transmitted, thereby reducing the amount of image data transmitted to the display device 200; and a program storage unit 122. When program data for a transmission to the display device 200 is stored in the program storage unit 122 by the CPU 104, the program storage unit 122 outputs flag information 126, which indicates that program data has been stored, to a display timing generator 125. The flag information 126 is reset by a transfer-complete signal 127 from the display timing generator 125. The image data generator 109 further includes an image data selector 124 which, on the basis of a select signal 128 from the display timing generator 125, selects either image data or program data as data to be transmitted to the display device 200 as the PD data. The display timing generator 125 generates vertical and horizontal synchronizing signals (VSYNC, HSYNC), which are the synchronizing signals of the image data, transmits these signals to the display device 200 and outputs a PROG signal indicating that program data will be transmitted in the following interval of vertical synchronizing signals to the display device 200 as the PD data. The display timing generator 125 outputs also the image-data enable signal (PDE) mentioned earlier. Any of the following three modes can be selected by the select signal 128 which the display timing generator 125 outputs to the image data selector 124:

(1) a mode for transmitting image data that has not been reduced;
(2) a mode for transmitting image data that has been reduced in order to transfer program data; and
(3) a mode for transmitting program data.

Figure 5:
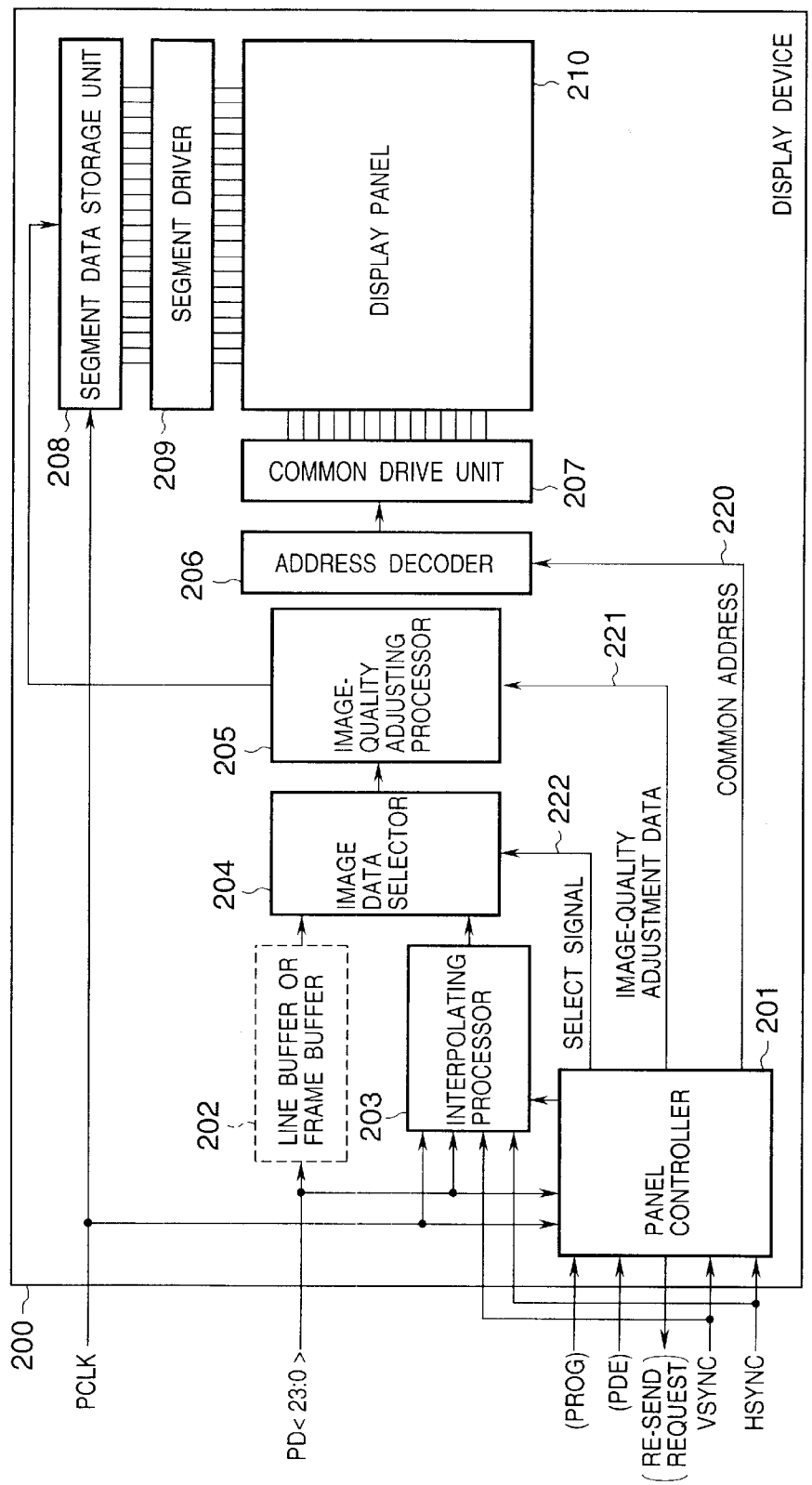
FIG. 5 is a block diagram showing the construction of a display device according to this embodiment.

FIG. 5 is a block diagram illustrating the construction of the display device 200 according to this embodiment.

As shown in FIG. 5, the display device 200 includes a panel controller 201 for controlling the overall operation of the display device 200. Specifically, on the basis of the PROG signal or PDE signal and HSYNC signal, the panel controller 201 determines whether received image data has been reduced or not. If the image data has been reduced, the panel controller 201 outputs a select signal 222 to instruct an image-data selector 204 to select image data that has been interpolated by an interpolating processor 203. In a case where image data to be transmitted from the display controller 100 has been reduced, the interpolating processor 203 interpolates this image data and reconstructs the original image data. Further, if, on the basis of the PROG signal, etc., the panel controller 201 senses that program data has been transmitted, the panel controller 201 extracts image-quality adjustment data contained in the program data and transmits the adjustment data to an image-quality adjusting processor 205. Further, the panel controller 201 obtains a common address based upon the vertical synchronizing signal and outputs this to an address decoder 206 as a common address 220. If program data sent via a PD bus includes error detection data such as parity, the panel controller 201 performs a parity check and, if an error is sensed, requests that the display controller 100 re-transmits the program data.

A line buffer or frame buffer 202 is not always necessary. However, in order to determine whether program data is being sent, the buffer may be used to store one line or one frame of image data or program data. The image-quality adjusting processor 205 performs various image-quality adjustments such as adjustment of contrast, luminance, color and gamma value of a displayed image. On the basis of the display timing of image data, the address decoder 206 obtains scanning drive row-direction wiring of a display panel 210, and a prescribed voltage is applied to the selected row-direction wiring by a common drive unit 207. A segment data storage unit 208 stores one line of image data, which has been processed by the image-quality adjusting processor 205, applied thereto in sync with PCLK, and outputs the image data to a segment driver 209, thereby driving display pixels in the column direction. The display panel 210 may be the above-mentioned display panel using surface-conduction emission devices, CRT or liquid crystal or plasma display panel.

A case in which program data is transmitted from the display controller 100 to the display device 200 will now be described in detail.

Figure 6:
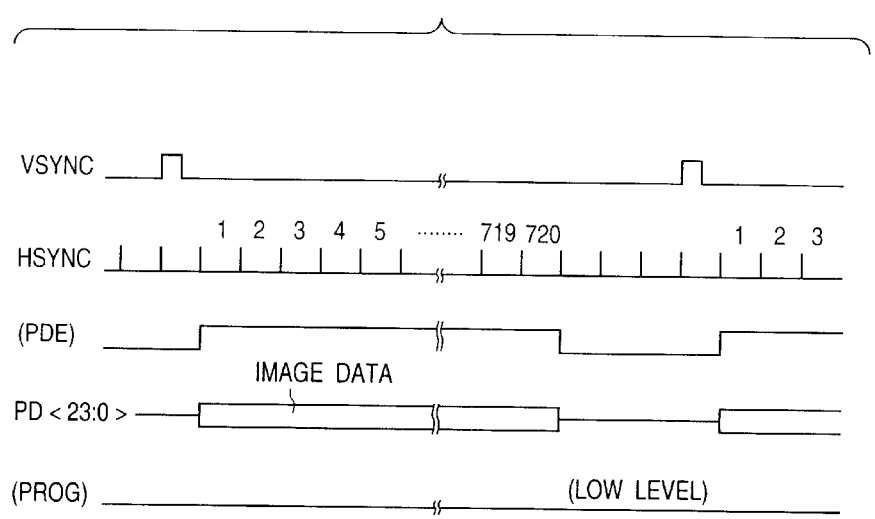
FIG. 6 is a timing chart useful in describing timing in an ordinary image-data transmit mode in a digital interface according to this embodiment.

FIG. 6 is a timing chart useful in describing the transmit timing of ordinary image data. Here it is assumed that the display resolution of the display panel 210 is 720P (720×1280). Accordingly, 720 lines of image data (24 bits per pixel) corresponding to each display line are transmitted in sync with the horizontal synchronizing signals (HSYNC) following the vertical synchronizing signal (VSYNC). At transmission of this image data, the PDE signal is at the high level and the PROG signal indicative of program data remains at the low level.

[First Embodiment]

In the first embodiment, a case in which a dedicated signal line indicating transmission of program data is provided, as in the manner of the PROG signal mentioned above, will be described.

Figure 7:
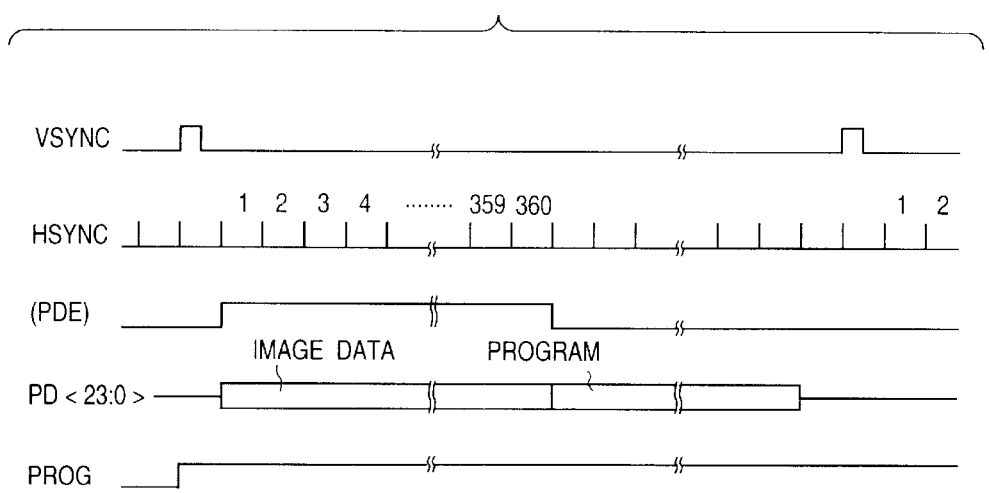
FIG. 7 is a timing chart useful in describing transmission timing of image data and program data according to the first embodiment.

FIG. 7 is a timing chart illustrating operation according to a first embodiment of the present invention. The PROG signal for indicating program data to be transmitted in an interval of vertical synchronizing signals is raised to the high level before the vertical synchronizing signal (VSYNC) is output. In response, the display device 200 senses the absence or presence of program data within the period of the vertical synchronizing signal. More specifically, the display device 200 judges that program data follows the fall of the PDE signal and accepts data on the PDE signal line (24 bits) as program data.

Figure 8:
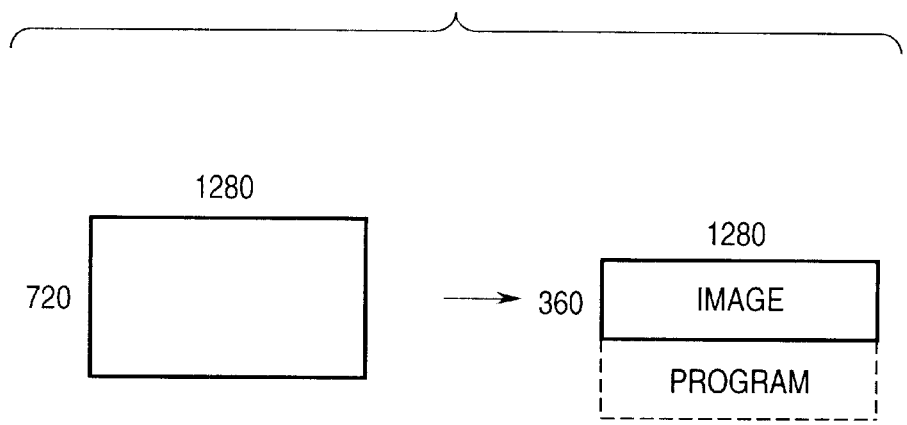
FIG. 8 is a diagram useful in describing an example of reduction of image data according to this embodiment.

Accordingly, as shown in FIG. 8, image data of 720 (lines)×1280 (pixels) is reduced to 360×1280 and the program data is transmitted at the transmission timing of the remaining 360×1280 image data. The PDE signal, therefore, falls at the 360th line in FIG. 7. Upon receiving this image data, the display device 200 executes interpolation processing in the vertical direction, thereby generating and displaying 720×1280 image data. It should be noted that image data may be extracted every other line, for example, in order to thus halve the number of scanning lines. In such case the display device 200, by interpolating two lines, can restore the image data of the line that was eliminated by downsampling.

Figure 9:
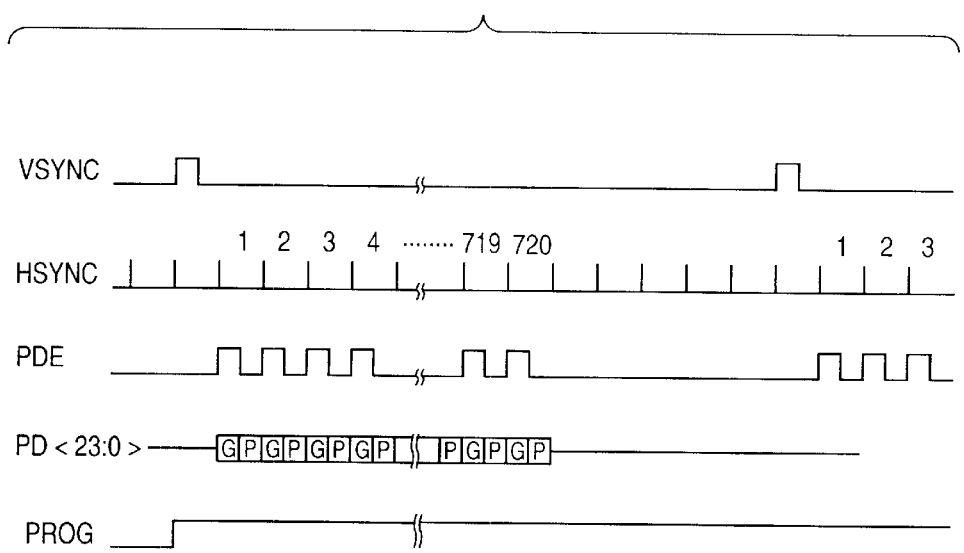
FIG. 9 is a timing chart useful in describing another example of operation according to this embodiment.
Figure 10:
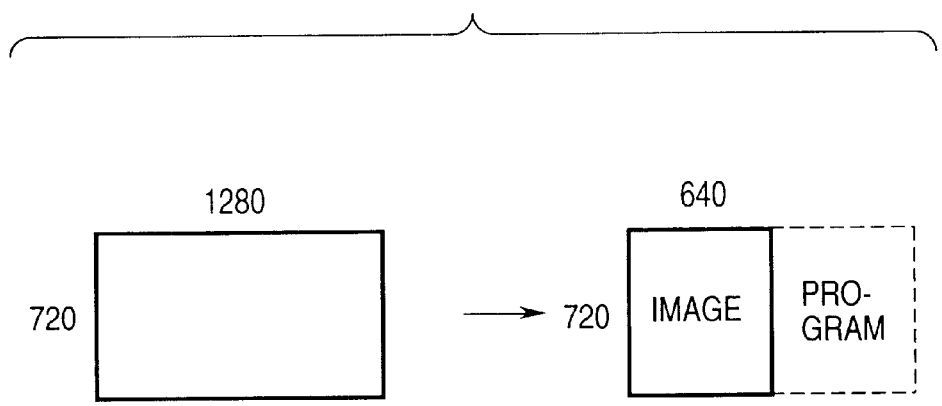
FIG. 10 is a diagram useful in describing an example of reduction of image data according to this embodiment.

FIG. 9 is a timing chart illustrating another example of operation according to the first embodiment. Here also the PROG signal for indicating program data to be transmitted in an interval of vertical synchronizing signals is raised to the high level before the vertical synchronizing signal (VSYNC) is output. In response, the display device 200 senses whether program data is present within the period of the vertical synchronizing signal. More specifically, the image data transmitted from the display controller 100 has been reduced by half in the horizontal direction, as shown in FIG. 10. Accordingly, 640 pixels of image data (half of one line) are received while the PDE signal is at the high level in one horizontal scanning interval. The display device 200 judges that program data, in an amount equivalent to the timing of the remaining 640 pixels of image data, follows the fall of the PDE signal and accepts data on the PDE signal line as program data. In FIG. 9, the characters "G" and "P" represent image data and program data, respectively.

Accordingly, as shown in FIG. 10, image data of 720 (lines)×1280 (pixels) is reduced to 720 (lines)×640 (pixels), and the program data is transmitted at the transmission timing of the remaining 720×640 image data. The PDE signal attains the high level (indicating image data) during preceding 640 pixels and falls (indicating program data) during the timing of the following 640 pixels in one horizontal scanning interval. The display device 200 accepts the program data at the timing of the following 640 pixels during low level of the PDE signal on each scanning line, and interpolates the image data in the horizontal direction to double the amount of image data, thereby generating and displaying 720×1280 image data. In FIG. 10, every other pixel of one line may be thinned to obtain 640 pixels of one line of image data.

Figure 11:
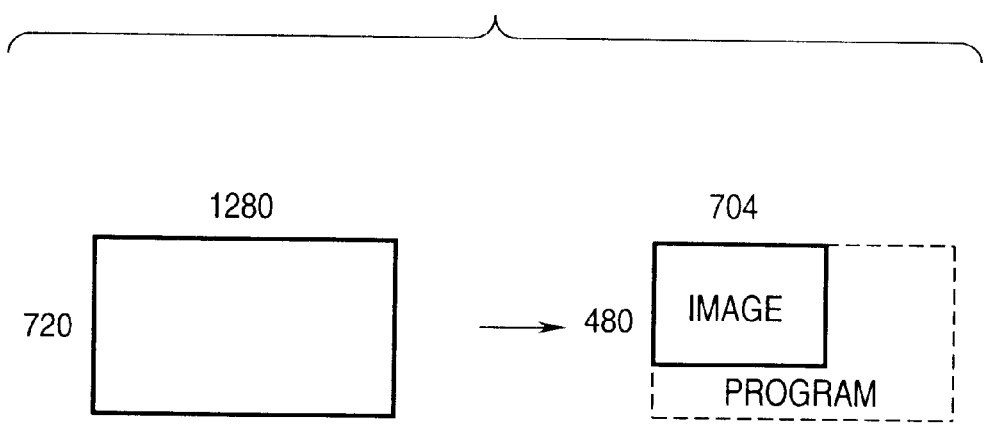
FIG. 11 is a diagram useful in describing an example of reduction of image data according to this embodiment.

Further, in a case where image data of 720 (lines)×1280 (pixels) is compressed in both the vertical and horizontal directions, as shown in FIG. 11, to obtain image data of 480 (lines)×704 (pixels), a timing chart of the kind shown in FIG. 9 described above applies. In this case, however, the PDE signal attains the high level only for a time corresponding to 704 pixels in one horizontal scanning interval and is at the low level for a time corresponding to the remaining 576 pixels, at which timing the program data is transmitted. As for the image data in the line direction, 480 lines are sent in one vertical scanning interval.

Figure 12:
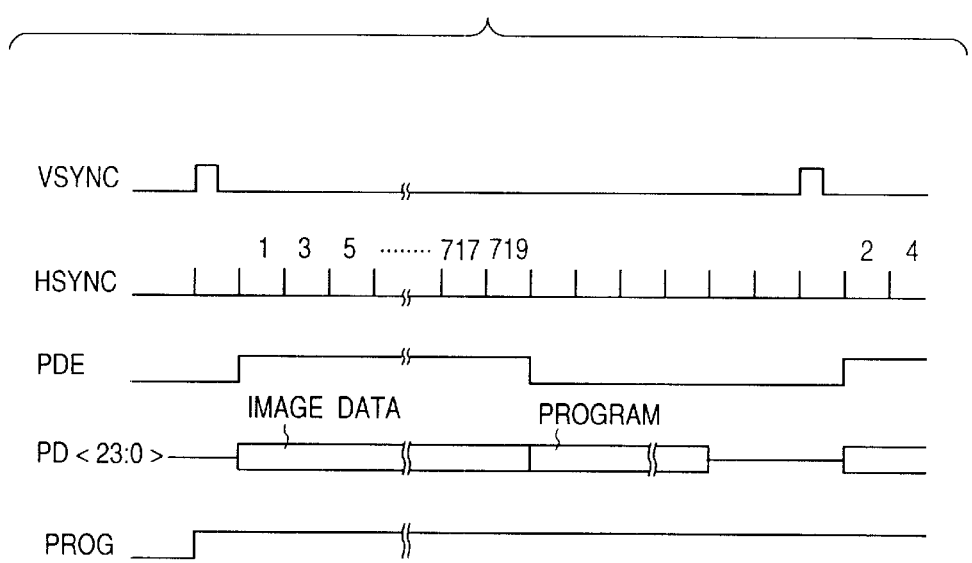
FIG. 12 is a timing chart showing another example of operation according to the first embodiment.

FIG. 12 is a timing chart illustrating another example of operation according to the first embodiment. Here also the signal for indicating program data to be transmitted in an interval of vertical synchronizing signals is raised to the high level before the vertical synchronizing signal is output. In response, the display device 200 senses the absence or presence of program data within the period of the vertical synchronizing signal. More specifically, image data transmitted from the display controller 100 has its odd-numbered and even-numbered lines sent separately in different vertical scanning intervals, as shown in FIG. 12.

Figure 13:
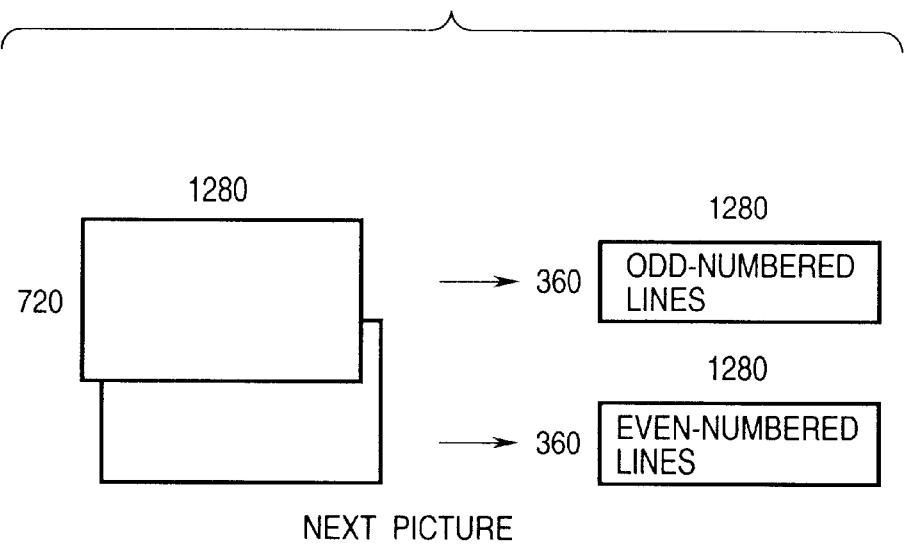
FIG. 13 is a diagram useful in describing an example of the partitioning of image data according to this embodiment.

Of image data of 720 (lines)×1280 (pixels), only the image data on the odd-numbered lines is transmitted in the initial vertical scanning interval, and the program data is transmitted at the transmission timing of the remaining 360 lines of image data in this vertical scanning interval, as shown in FIGS. 12 and 13. The image data of the even-numbered lines is transmitted in the next vertical scanning interval and, in similar fashion, the program data is transmitted at the transmission timing of the remaining 360 lines of image data in this vertical scanning interval. Accordingly, the display device 200 makes a conversion to progressive data based upon image data comprising odd-numbered lines in the initial vertical scanning interval and image data comprising even-numbered lines in the next vertical scanning interval, generates 720×1280 image data and displays the same.

[Second Embodiment]

In a second embodiment of the invention, there is provided a dedicated signal line indicating transmission of program data, as in the manner of the PROG signal, the above-mentioned PDE signal is deleted and the number of horizontal synchronizing signals is counted to determine whether data is image data or program data.

More specifically, in FIG. 7 the PROG signal for indicating program data to be transmitted in an interval of vertical synchronizing signals is raised to the high level before the vertical synchronizing signal (VSYNC) is output. In response, the display device 200 senses the absence or presence of program data within the period of this vertical synchronizing signal. In this embodiment the PDE signal is eliminated and, when the display device 200 counts the horizontal synchronizing signal 360 times, it construes that program data will follow and accepts the data on the PD signal line as program data.

Accordingly, as shown in FIG. 8, image data of 720 (lines)×1280 (pixels) is reduced to 360 (lines)×1280 (pixels) and the program data is transmitted at the transmission timing of the remaining image data of 360 (lines)×1280 (pixels). Upon receiving this image data, therefore, the display device 200 interpolates 360 lines of data in the vertical direction, thereby generating and displaying image data of 720 (lines)×1280 (pixels).

This is applicable to a case where the PDE signal is eliminated in FIG. 9. That is, the PROG signal for indicating program data to be transmitted in an interval of vertical synchronizing signals is raised to the high level before the vertical synchronizing signal (VSYNC) is output. In response, the display device 200 senses the absence or presence of program data within the period of this vertical synchronizing signal. More specifically, the image data transmitted from the display controller 100 has been reduced by half in the horizontal direction, as shown in FIG. 10. After the preceding 640 pixels are counted in one horizontal scanning interval, it is construed that program data, in an amount equivalent to the timing of the remaining 640 pixels of image data, follows, and the display device 200 accepts the data on the PDE signal line as program data.

Accordingly, as shown in FIG. 10, image data of 720 (lines)×1280 (pixels) is reduced to image data of 720 (lines)×640 (pixels), and the program data is transmitted at the transmission timing of the remaining image data of 720 (lines)×640 (pixels). The display device 200 therefore counts preceding 640 pixels on each scanning line, then accepts the program data at the timing of the following 640 pixels and subjects the image data to interpolation processing in the horizontal direction, thereby generating and displaying 720×1280 image data.

Similarly, in a case where image data is compressed in both the vertical and horizontal directions, as shown in FIG. 11, so that image data of 720 (lines)×1280 (pixels) becomes image data of 480 (lines)×704 (pixels), a timing chart of the kind shown in FIG. 9 but with the omission of the PDE signal applies. In this case, however, when 704 pixels are counted in one horizontal scanning interval, program data is accepted for a time corresponding to the remaining 576 pixels. Further, since 480 lines of image data are transmitted in one vertical scanning interval, the program data sent in the vertical scanning interval can be received at the receive timing of the remaining 240 lines of image data.

This is applicable also to a case where the PDE signal is eliminated in FIG. 12. Here also the PROG signal for indicating program data to be transmitted in an interval of vertical synchronizing signals is raised to the high level before the vertical synchronizing signal is output. In response, the display device 200 senses the absence or presence of program data within the period of the vertical synchronizing signal. More specifically, image data transmitted from the display controller 100 has its odd-numbered and even-numbered lines sent separately in different vertical scanning intervals, as shown in FIG. 12.

Of image data of 720 (lines)×1280 (pixels), only the image data on the odd-numbered lines is transmitted in the initial vertical scanning interval, and the program data is transmitted at the transmission timing of the remaining 360 lines of image data in this vertical scanning interval, as shown in FIGS. 12 and 13. Then, the image data of the even-numbered lines is transmitted in the next vertical scanning interval and the program data is transmitted at the transmission timing of the remaining 360 lines of image data in this vertical scanning interval. Accordingly, the display device 200 counts the number of horizontal synchronizing signals and, upon sensing that the line count is "719" in a transmission frame of the odd-numbered lines, accepts PD as the program data from this moment onward. Upon further sensing that the line count is "720" in a transmission frame of the even-numbered lines, the display device 200 accepts PD as the program data. The display device 200 makes a conversion to progressive data based upon image data comprising odd- and even-numbered lines received in two vertical scanning intervals, generates the original 720×1280 image data and displays the same.

Thus, in accordance with the second embodiment, as described above, the PDE signal can be eliminated.

[Third Embodiment]

According to a third embodiment of the present invention, it is determined whether data to be transmitted is image data or program data based upon the pulse width of the PDE signal.

Figure 14:
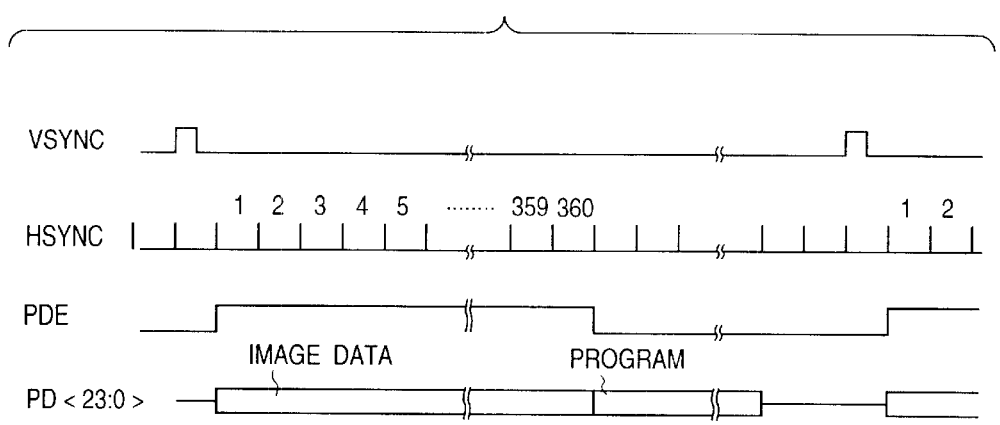
FIG. 14 is a timing chart useful in describing transmission timing of image data and program data according to a third embodiment.

Specifically, if the PDE signal falls after receiving 360 lines regardless of the fact that the original image data is supposed to be 720 lines, as shown in FIG. 14, it is construed that program data follows and the data on the PD signal line is accepted as program data.

Accordingly, as shown in FIG. 8, image data of 720 (lines)×1280 (pixels) is reduced to 360 (lines)×1280 (pixels) and the program data is transmitted at the transmission timing of the remaining image data of 360 (lines)×1280 (pixels). The PDE signal, therefore, falls after receiving the 360th line. Upon receiving this image data, the display device 200 executes interpolation processing in the vertical direction, thereby generating and displaying image data of 720 (lines)×1280 (pixels).

It should be noted that in this case, whether or not the received image data has been compressed can be judged only at the moment the PDE signal falls. This makes it is necessary for the display device 200 to have a frame memory for storing at least one frame of received image data.

Figure 15:
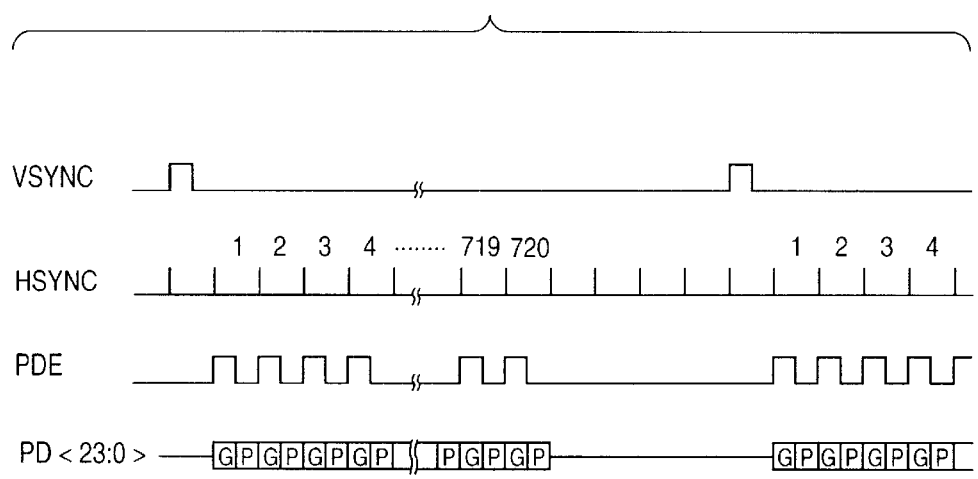
FIG. 15 is a timing chart showing another example of operation according to the third embodiment.

FIG. 15 is a timing chart illustrating another example of operation according to the third embodiment. Here the PROG signal for indicating the program data to be transmitted in an interval of vertical synchronizing signals has been eliminated. The display device 200 senses the absence or presence of program data within the period of the horizontal synchronizing signal. More specifically, the image data transmitted from the display controller 100 has been reduced by half in the horizontal direction, as shown in FIG. 10. In FIG. 15, therefore, the number of items of pixel data are counted after the PDE signal falls in one horizontal scanning interval. Since the value of the count is "640" at the moment the PDE signal decays, it is construed that program data, in an amount equivalent to the timing of the remaining 640 pixels of image data, follows, and the display device 200 accepts the data on the PD signal line as program data. In FIG. 15, the characters "G" and "P" represent image data and program data, respectively.

Accordingly, as shown in FIG. 10, image data of 720 (lines)×1280 (pixels) is reduced to 720 (lines)×640 (pixels), and the program data is transmitted at the transmission timing of the remaining 720 (lines)×640 (pixels) image data. The display device 200 therefore accepts the program data at the timing of the next 640 pixels after the fall of the PDE signal at each horizontal scanning interval and executes interpolation processing in the horizontal direction, thereby generating and displaying 720×1280 image data.

Further, in a case where image data of 720 (lines)×1280 (pixels) is compressed in both the vertical and horizontal directions, as shown in FIG. 11, to obtain image data of 480 (lines)×704 (pixels), a timing chart of the kind shown in FIG. 15 described above applies in a manner similar to that mentioned above. In this case, however, the PDE signal attains the high level only for a time corresponding to 704 pixels in one horizontal scanning interval and is at the low level for a time corresponding to the remaining 576 pixels, at which timing the program data is transmitted. As for the image data in the line direction, only 480 lines are sent in one vertical scanning interval, and the program data is received at the reception timing of the remaining 240 (lines)×1280 (pixels)of image data.

Figure 16:
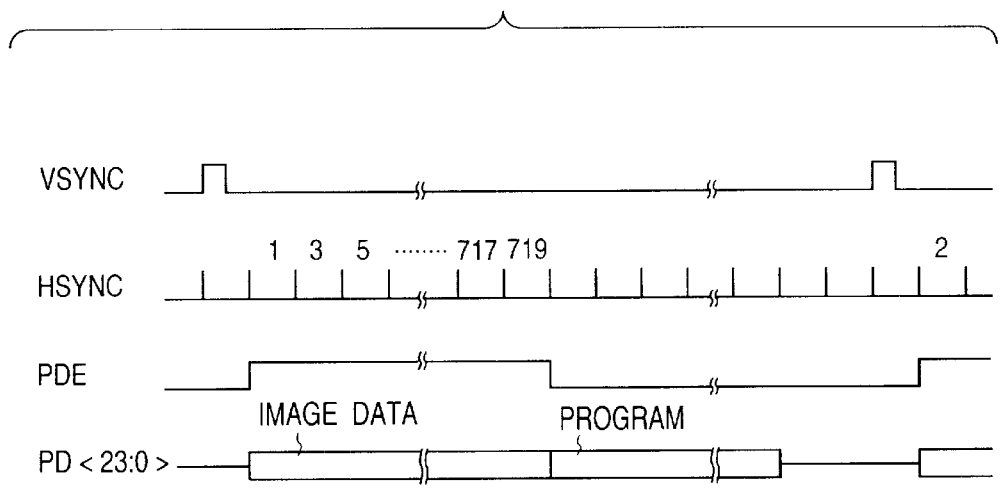
FIG. 16 is a timing chart showing another example of operation according to the third embodiment.

FIG. 16 is a timing chart illustrating another example of operation according to the third embodiment. Here also the PROG signal has been eliminated. The display device 200 senses the absence or presence of program data within the period of the vertical synchronizing signal. More specifically, the image data transmitted from the display controller 100 has its odd-numbered and even-numbered lines sent separately in different vertical scanning intervals, as shown in FIG. 16.

Of image data of 720 (lines)×1280 (pixels), only the image data on the odd-numbered lines is transmitted in the initial vertical scanning interval, the program data is transmitted at the transmission timing (when the PDE signal is at the low level) of the remaining 360 lines of image data in this vertical scanning interval, and only the image data on the even-numbered lines is transmitted in the next vertical scanning interval, as shown in FIGS. 13 and 16. Accordingly, the display device 200 makes a conversion to progressive data based upon image data comprising odd-numbered lines and image data comprising even-numbered lines received in two vertical scanning intervals, generates the original 720×1280 image data and displays the same.

[Fourth Embodiment]

Figure 17:
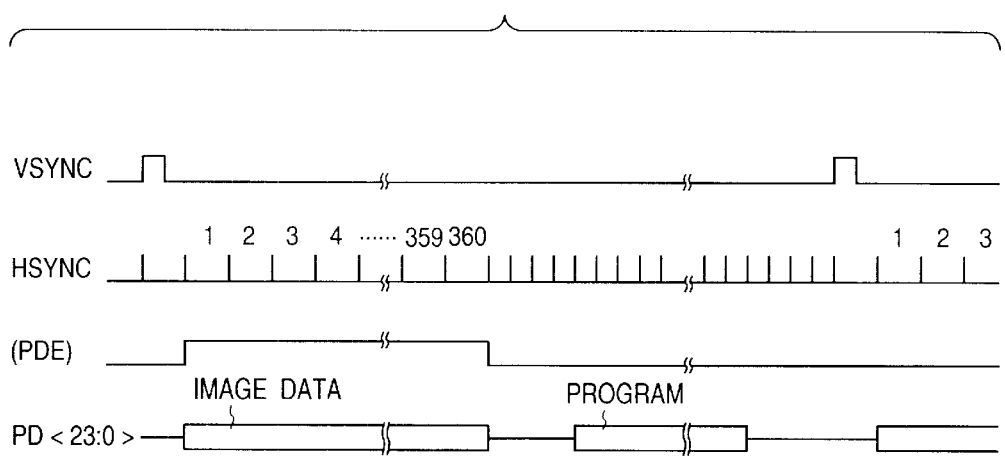
FIG. 17 is a timing chart useful in describing transmission timing of image data and program data according to a fourth embodiment.

A fourth embodiment of the present invention will now be described. According to the fourth embodiment, the period of the horizontal synchronizing signal is adopted as the usual period when image data is being transmitted, and the period of the horizontal synchronizing signal is shortened when program data is being transmitted. More specifically, when the display device 200 receives a horizontal synchronizing signal of the short period three times in succession, it recognizes that a transition has been made to the program-data transmit mode. FIG. 17 is a timing chart that illustrates this timing.

Figure 18:
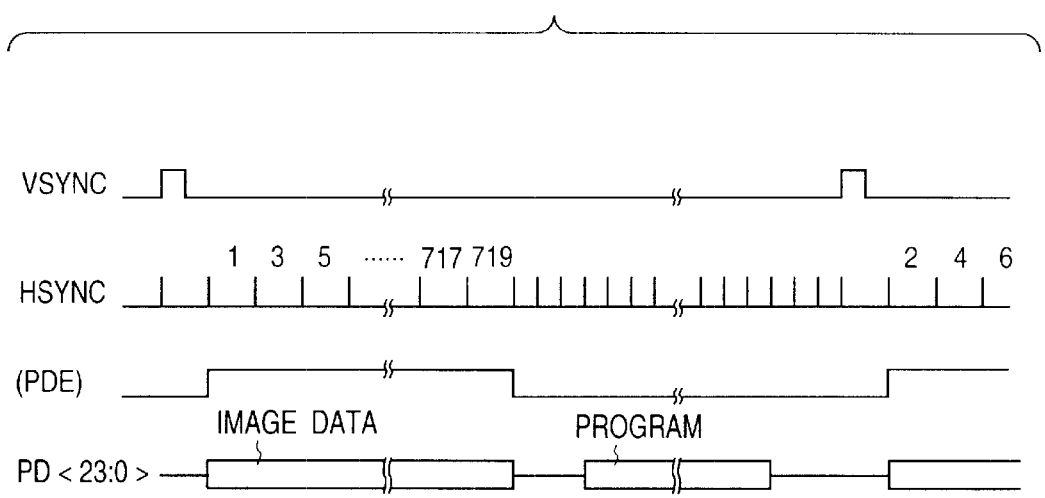
FIG. 18 is a timing chart showing another example of operation according to a fourth embodiment.

Further, of image data of 720 (lines)×1280 (pixels), only the image data on the odd-numbered lines is transmitted in the initial vertical scanning interval, the period of the horizontal synchronizing signal is shortened and the program data is transmitted at the transmission timing of the remaining 360 lines of image data in this vertical scanning interval, only the image data on the even-numbered lines is transmitted in the next vertical scanning interval, and then the period of the horizontal synchronizing signal is shortened and the program data is transmitted, as shown in FIG. 18. Accordingly, the display device 200 makes a conversion to progressive data based upon image data comprising odd-numbered lines and image data comprising even-numbered lines received in two vertical scanning intervals, generates the 720×1280 image data and displays the same.

Thus, in accordance with the fourth embodiment, dedicated lines such as the PDE or PROG signal lines are unnecessary. Further, according to the fourth embodiment, the display device 200 monitors the period of the horizontal synchronizing signal to detect whether the mode is the program-data transmit mode. This makes necessary a buffer for storing the image data until it is detected.

[Fifth Embodiment]

In each of the foregoing embodiments, the form of the program data is assumed to be a packet and the data length of the program data is declared by the header of the-packet data. The end of the program-data transmit mode is when the program data of the specified data length has been received. It is preferred that the packet data be further provided with error detection such as parity and with an error correction code, etc.

The transmission format of the program data in each of the foregoing embodiments will be described next.

Data considered as program data sent from the display controller 100 to the display device 200 is as set forth below.

(1) If the display controller 100 receives command data from the remote controller 115 and this is modification information relating to, e.g., adjustment of image quality displayable by the display device 200 (examples of the information being color, luminance, contrast and color temperature, etc.), then the display controller 100 reports this information to the display device 200.

(2) If a received digital-television image signal is output to the printer 111 via the I/O controller 105 and is printed by the printer, color-matching information (e.g., gamma value, color, etc.) is reported to the display device 200 in order to match the colors printed by the printer 111 and the colors of the image displayed on the display panel 210 of the display device 200.

(3) Program information of a computer or the like controlling the display device 200 is sent to the display device 200 via the display controller 100 and updating of the program in the display device 200 is executed.

Figure 19:
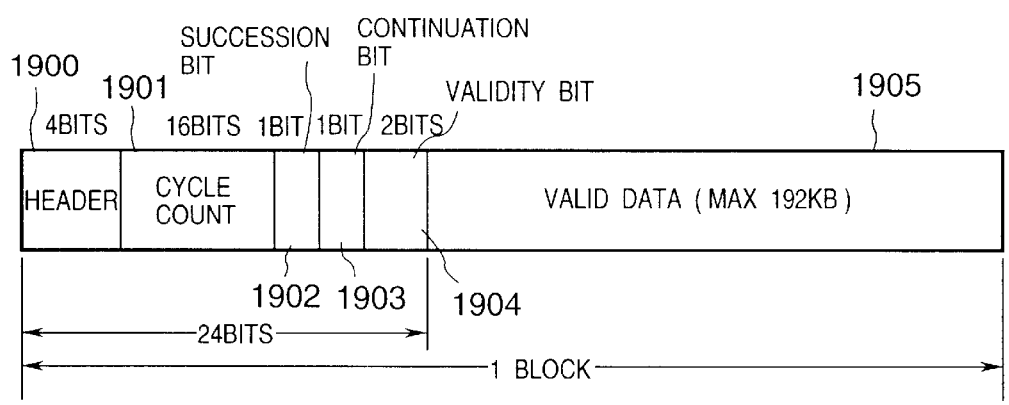
FIG. 19 is a diagram useful in describing the data format of program data according to this embodiment.

FIG. 19 is a diagram useful in describing the transmission format of this program data.

As shown in FIG. 19, the type of program data contained in the packet is set in a header 1900. An example of the header is illustrated in FIG. 20.

Figures 21A, 21B:
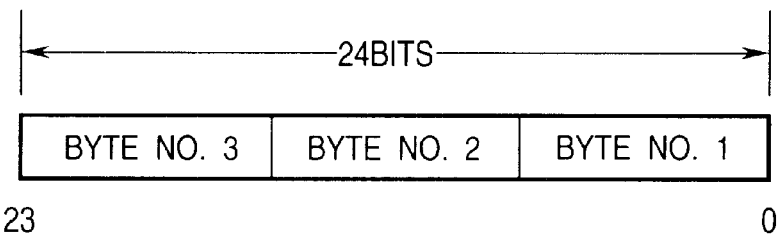
FIGS. 21A and 21B are diagrams useful in describing valid bytes of the program data of FIG. 19 and the content thereof.

Cycle count (16 bits) 1901 in FIG. 19 indicates how many times valid data appears on the above-mentioned 24-bit PD bus. Since the cycle count is composed of 16 bits, a maximum of 64 K×24 bits (=64×3 kilobytes) can be transmitted. Numeral 1902 denotes a succession bit. When data in excess of these 192 kilobytes of data is transmitted, this bit is set to "1" to indicate that the next packet of data will follow. Numeral 1903 denotes a continuation bit. This bit is set to "1" if the data is a continuation of the immediately preceding packet of data. Numeral 1904 denotes a validity byte (two bits). This indicates how many bytes among three bytes of the final 24 bits of data is valid data. As shown in FIGS. 21A and 21B, the positions of the valid bytes are designated in dependence upon the values of these two bits.

[Sixth Embodiment]

Figure 22:
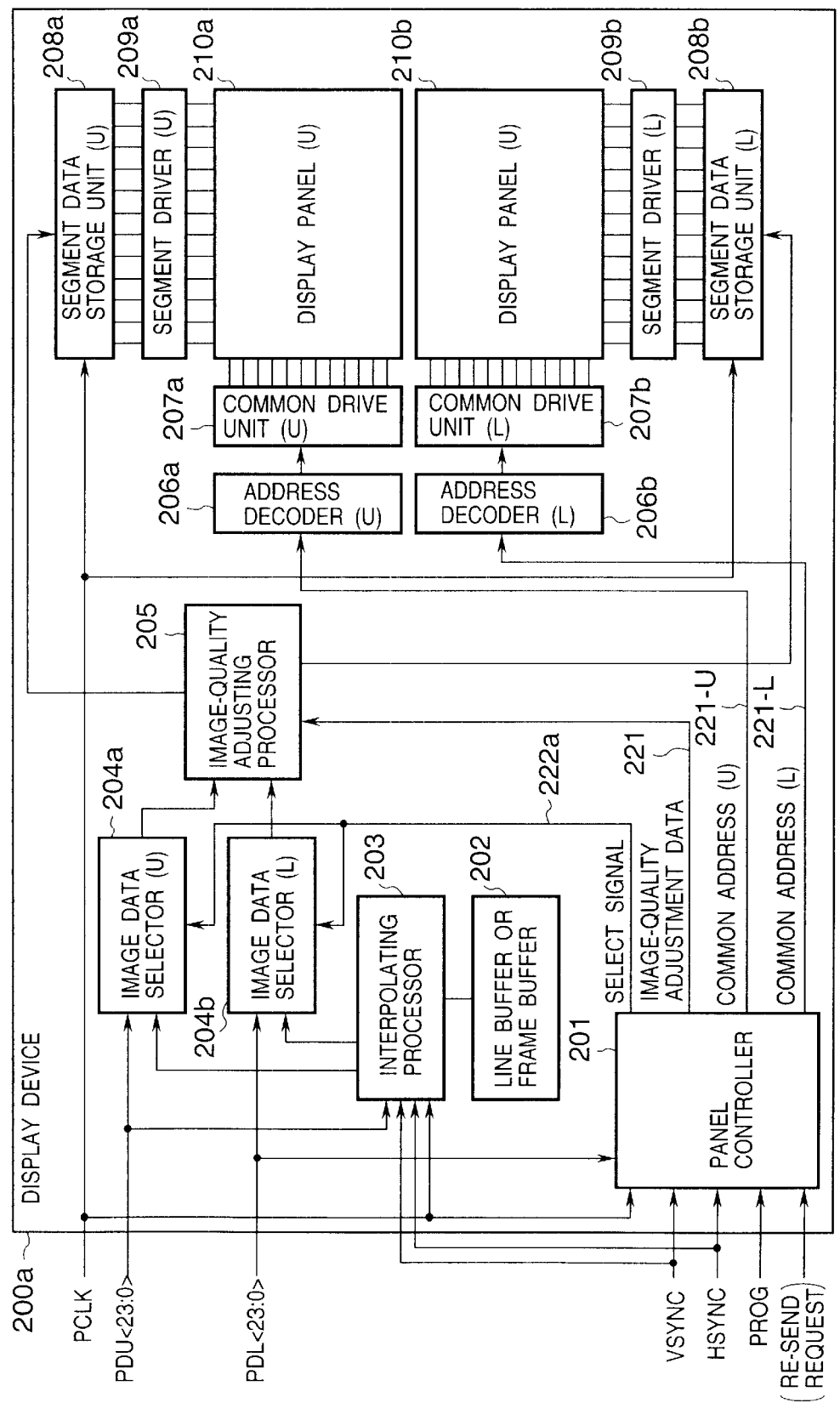
FIG. 22 is a block diagram showing the construction of a display device according to a sixth embodiment of the present invention.

FIG. 22 is a block diagram illustrating the construction of a display device 200a according to a sixth embodiment of the present invention. Components identical with those shown in FIG. 5 are designated by like reference characters and need not be described again. According to the sixth embodiment, the display panel 210 is divided into a display panel 210a for displaying the upper half and a display panel 210b for displaying the lower half, scanning lines of the display panels 210a, 210b in the line direction are driven by address decoders 206a, 206b and common drivers 207a, 207b, respectively, and driving signals from segment data storage units 208a, 208b and segment drivers 209a, 209b, respectively, are input to the column-direction wiring to drive the display panels for the purpose of presenting a display.

Data displayed on the upper display panel 210a enters from PDU (24 bits), and data displayed on the lower display panel 210b enters from PDL (24 bits). An image-data selector 204a selects PDU data in response to a select signal 222a from the panel controller 201, and an image-data selector 204b selects PDL data in response to the select signal 222a from the panel controller 201. The panel controller 201 resets the common addresses by the vertical synchronizing signal, generates common addresses for respective ones of the display panels 210a, 210b and outputs these signals to the address decoders 206a, 206b. Further, in accordance with image-quality adjustment data 221, the image-quality adjusting processor 205 applies image-quality adjustment processing to the image data for each display panel and outputs data for the display panel 210a to the segment-data storage unit 208a and data for the display panel 210b to the segment-data storage unit 208b.

Figure 23:
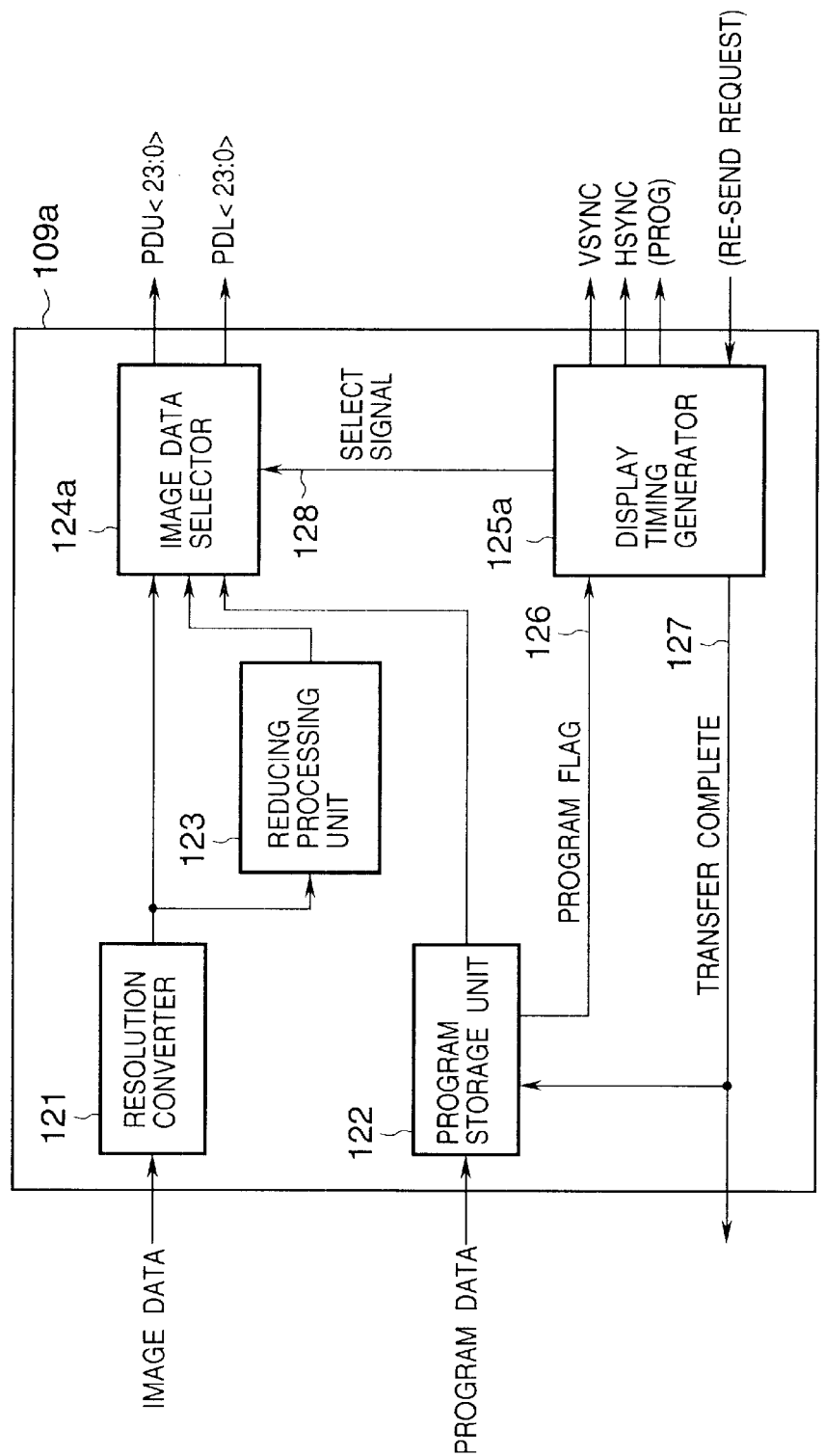
FIG. 23 is a block diagram showing the construction of an image data generator according to the sixth embodiment.

In conformity with this, an image data generator 109a corresponding to the image data generator 109 of the display controller 100 uses an image data selector 124a to generate the PDU data and PDL data in accordance with the select signal 128, thereby outputting these items of image data. It should be noted that components in FIG. 23 identical with those of the image data generator 109 shown in FIG. 4 are designated by like reference characters and are not described again.

Figure 24:
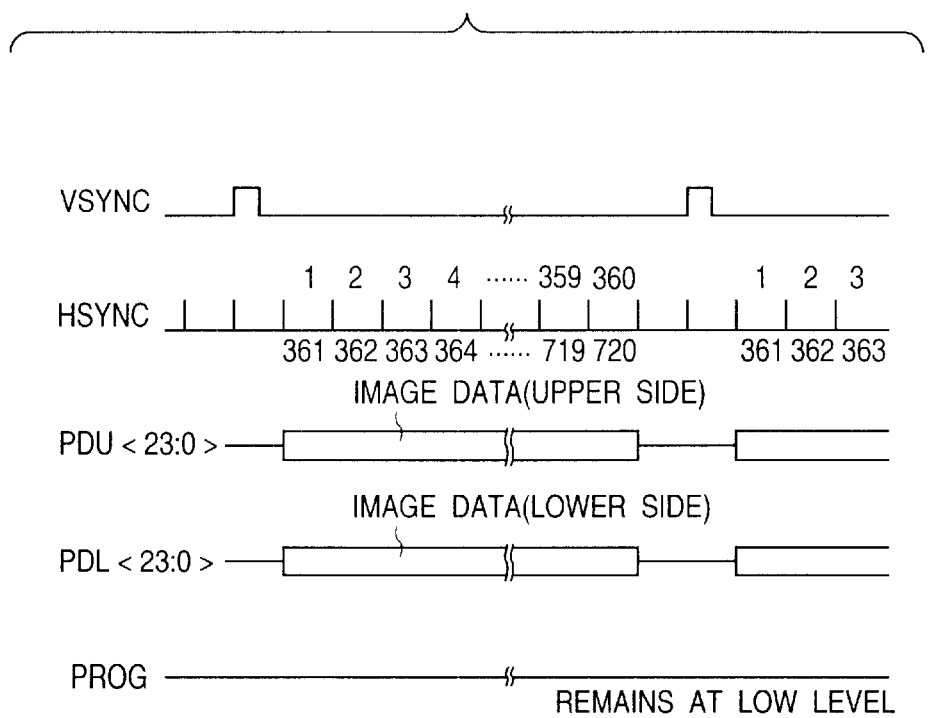
FIG. 24 is a timing chart useful in describing transmission timing of image data and program data according to the sixth embodiment.

FIG. 24 is a timing chart illustrating transmission timing of image data according to the sixth embodiment. Here the PDU data and PDL data of one line are transmitted within the period of the horizontal synchronizing signal.

It should be noted that although FIG. 22 illustrates an example in which all scanning lines of the display panel are divided into an upper side and a lower side, this does not impose a limitation upon the present invention. For example, the scanning lines may be divided into left and right sides instead and one display panel displays a left-side image and the other display panel displays a right-side image.

Here each of the display panels 210a, 210b has a display resolution of 360P (360 lines×1280 pixels) so that a resolution of 720×1280 is obtained when the upper and lower display panels are combined. Accordingly, 360 lines of each of the image data PDU, PDL (24 bits per pixel) corresponding to the display lines of each of the display panels are transmitted in parallel in sync with the horizontal synchronizing signal pulses (HSYNC) following the vertical synchronizing signal (VSYNC). At transmission of this image data, the PROG signal remains at the low level.

Figure 25:
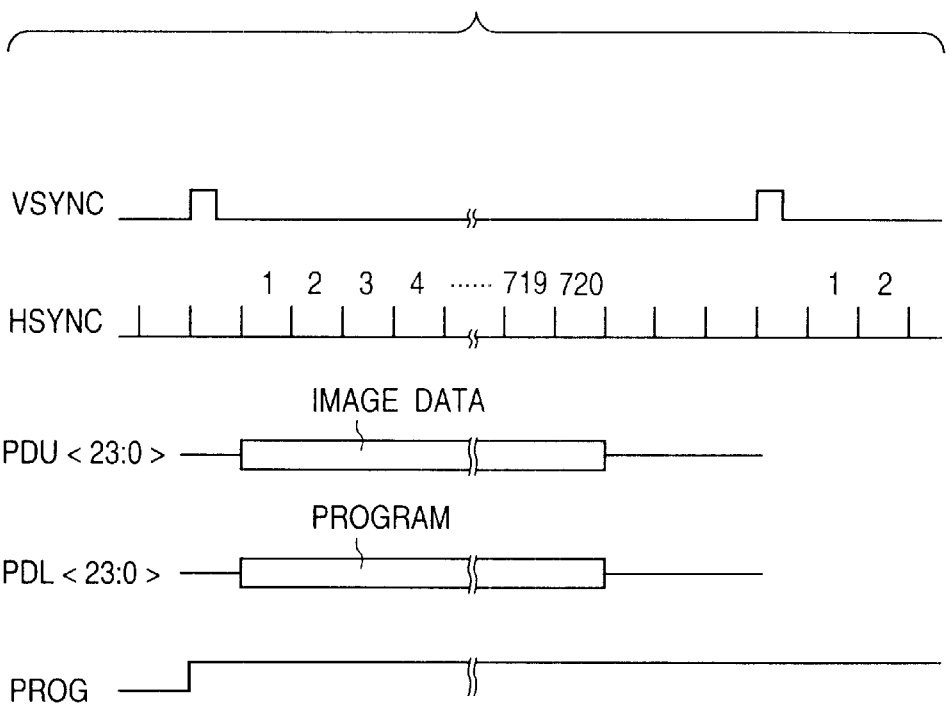
FIG. 25 is a timing chart useful in describing transmission timing of image data and program data according to the sixth embodiment.

FIG. 25 is a timing chart illustrating operation according to the sixth embodiment of the present invention. The PROG signal for indicating the program data to be transmitted in an interval of vertical synchronizing signals is raised to the high level before the vertical synchronizing signal is output. In response, the display device 200a senses the absence or presence of program data within the period of the vertical synchronizing signal. More specifically, the PDU data is image data and the PDL data is program data.

Accordingly, image data of 720 (lines)×1280 (pixels) is reduced to 360 (lines)×1280 (pixels), as shown in FIG. 8, this image data is displayed on the upper display panel 210*a*, and program data is transmitted using PDL corresponding to image data of 360 (lines)×1280 (pixels) with regard to the lower display panel 210*b*. Upon receiving this image data, the display device 200*a* may display the received data as is on the upper display panel 210*a* or, by executing interpolation processing in the vertical direction, may generate the original image data of 720 (lines)×1280 (pixels) and display it on the display panels 210*a* and 210*b*. It should be noted that image data may be extracted every other line, for example, in order to thus halve the number of scanning lines. In such case the display device 200, by interpolating two lines, can restore the image data of the line that was downsampled.

Thus, in accordance with the sixth embodiment, when program data is transmitted, image data is transmitted to one of the two display panels and the program data is output to a bus that transmits image data to the other display panel. As a result, a control-signal line such as for the above-mentioned PDE signal can be dispensed with. Further, the display device 200*a* need not have a buffer for storing image data until the program-data transmit mode is sensed.

It should be noted that the format of program data in the sixth embodiment is assumed to be a data format of the kind shown in FIG. 19 described above.

In each of the foregoing embodiments, the control unit and the display device are illustrated as being separate from each other. However, this does not impose a limitation upon the present invention. For example, the display apparatus may be one in which the control unit and display device are integrated into a single body.

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained also by supplying a storage medium storing the program codes of the software for performing the functions of the foregoing embodiments to a system or an apparatus, reading the program codes with a computer (e.g., a CPU or MPU) of the system or apparatus from the storage medium, and then executing the program codes.

In this case, the program codes read from the storage medium implement the novel functions of the invention, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiments are implemented by executing the program codes read by a computer, it goes without saying that the present invention covers a case where an operating system or the like running on the computer performs a part of or the entire process in accordance with the designation of program codes and implements the functions according to the embodiments.

It goes without saying that the present invention further covers a case where, after the program codes read from the storage medium are written in a function expansion board inserted into the computer or in a memory provided in a function expansion unit connected to the computer, a CPU or the like contained in the function expansion board or function expansion unit performs a part of or the entire process in accordance with the designation of program codes and implements the function of the above embodiment.

Thus, in accordance with the embodiments as described above, the amount of data transmitted from a display controller to a display device is reduced and command data such as that of a program can be transmitted from the display controller to the display device during idle time produced by reducing the amount of data.

The present invention is not limited to the above embodiments and various changes can be made within the spirit and scope of the present invention. Therefore, to apprise the public of the scope of the present invention, the following claims are made.

What is claimed is:

1. An image display control apparatus for outputting an image signal to a display device comprising:

judging means for judging whether or not to transmit control data to the display device;

reducing means for reducing the amount of image data, which is to be transmitted to the display device, in comparison with display resolution of the display device;

transmitting means for transmitting the image data without reducing by said reducing means in a case where said judging means judges that the control data is not to be transmitted, and transmitting image data reduced by said reducing means to the display device, in a case where said judging means judges that the control data is to be transmitted; and control-data transmitting means for transmitting the control data to the display device over a period of transmission time commensurate with the amount of image data that has been reduced by said reducing means.

2. The apparatus according to claim 1, wherein said reducing means reduces the amount of image data by downsampling line data of the image data on a per-line basis.

3. The apparatus according to claim 1, wherein said reducing means reduces the amount of image data by downsampling line data of the image data on a per-pixel basis.

4. The apparatus according to claim 1, wherein said reducing means reduces the amount of image data by reading out line data of the image data every odd-numbered line or every even-numbered line.

5. The apparatus according to claim 1, wherein said control-data transmitting means changes the frequency of the synchronizing signal when the control data is transmitted.

6. The apparatus according to claim 1, wherein said control-data transmitting means specifies that transmission of control data is in progress by a predetermined control signal when the control data is transmitted.

7. The apparatus according to claim 1, wherein said display device has a plurality of display units;

said transmitting means transmits image data to one of said display units; and said control-data transmitting means transmits the control data in sync with transmission of the image data using a signal line that is for transmitting image data to said plurality of display units.

8. The apparatus according to claim 1, wherein said display device includes:

receiving means for receiving the image data the amount of data whereof has been reduced;

interpolating means for interpolating the image data, which has been received by said receiving means, in conformity with the display resolution of said display device; and a display unit for displaying an image based upon image data interpolated by said interpolating means.

9. The apparatus according to claim 8, wherein said display device has image-quality adjusting means for adjusting image quality of an image, which is displayed on said display unit, based upon the control data.

10. An image display control method for outputting an image signal to a display device, comprising:

a judgment step of judging whether or not to transmit control data to the display device;

a reducing step of reducing the amount of image data, which is to be transmitted to the display device, in comparison with display resolution of the display device;

a transmitting step of transmitting the image data without reducing at said reducing step, in a case where it is judged at said judgment step that the control data is not to be transmitted, and transmitting image data reduced at said reducing step to the display device in a case where it is judged at said judgment step that the control data is to be transmitted; and a control-data transmitting step of transmitting the control data to the display device over a period of transmission time commensurate with the amount of image data that has been reduced at said reducing step.

11. The method according to claim 10, wherein said reducing step reduces the amount of image data by down-sampling line data of the image data on a per-line basis.

12. The method according to claim 10, wherein said reducing step reduces the amount of image data by down-sampling line data of the image data on a per-pixel basis.

13. The method according to claim 10, wherein said reducing step reduces the amount of image data by reading out line data of the image data every odd-numbered line or every even-numbered line.

14. The method according to claim 10, wherein said control-data transmitting step changes the frequency of the synchronizing signal when the control data is transmitted.

15. The method according to claim 10, wherein said control-data transmitting step specifies that transmission of control data is in progress by a predetermined control signal when the control data is transmitted.

16. The method according to claim 10, wherein said display device has a plurality of display units;

said transmitting step transmits image data to one of said display units; and said control-data transmitting step transmits the control data in sync with transmission of the image data using a signal line that is for transmitting image data to said plurality of display units.

17. The apparatus method to claim 10, further comprising:

a receiving step of receiving the image data the amount of data whereof has been reduced;

an interpolating step of interpolating the image data, which has been received at said receiving step, in conformity with the display resolution of said display device; and a display step of displaying an image based upon image data interpolated at said interpolating step.

18. The method according to claim 17, further comprising an image-quality adjusting step of adjusting image quality of an image, which is displayed on said display unit, based upon the control data.

* * * * *

UNITED STATES PATENT AND TRADEMARK OFFICE
CERTIFICATE OF CORRECTION

PATENT NO.    : 6,492,982 B1                                              Page 1 of 1
DATED         : December 10, 2002
INVENTOR(S)   : Eiichi Matsuzaki et al.

It is certified that error appears in the above-identified patent and that said Letters Patent is hereby corrected as shown below:

<u>Column 9,</u>
Line 49, "is" should be deleted.

Signed and Sealed this

Eleventh Day of November, 2003

JAMES E. ROGAN
*Director of the United States Patent and Trademark Office*